US 8,640,031 B2

(12) United States Patent
Kim et al.

(10) Patent No.: US 8,640,031 B2
(45) Date of Patent: Jan. 28, 2014

(54) METHOD AND APPARATUS FOR CONTROLLING REMOTE USER INTERFACE IN A HOME NETWORK

(75) Inventors: Jun-Hyung Kim, Gyeonggi-do (KR); Ho-Yeon Park, Seoul (KR); Sung-Oh Hwang, Gyeonggi-do (KR); Hyung-Jin Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 306 days.

(21) Appl. No.: 12/872,570

(22) Filed: Aug. 31, 2010

(65) Prior Publication Data

US 2011/0055716 A1   Mar. 3, 2011

(30) Foreign Application Priority Data

Sep. 1, 2009   (KR) .................. 10-2009-0082238

(51) Int. Cl.
*G06F 15/177*   (2006.01)
(52) U.S. Cl.
USPC ......................................... 715/734; 715/740
(58) Field of Classification Search
USPC .......................................... 715/734, 735, 740
See application file for complete search history.

(56) References Cited

U.S. PATENT DOCUMENTS

| 7,140,422 | B2* | 11/2006 | Malone et al. | ........... 165/104.33 |
| 7,586,398 | B2* | 9/2009 | Huang et al. | .................. 340/10.5 |
| 7,627,825 | B2* | 12/2009 | Kakuda | ......................... 715/744 |
| 7,958,272 | B2* | 6/2011 | Ko et al. | ........................ 709/250 |
| 2005/0125425 | A1* | 6/2005 | Friedman et al. | ............. 707/100 |
| 2007/0169080 | A1* | 7/2007 | Friedman | ...................... 717/168 |
| 2009/0023389 | A1* | 1/2009 | Paryani | ........................ 455/41.2 |
| 2009/0254778 | A1* | 10/2009 | Huang et al. | .................... 714/38 |

OTHER PUBLICATIONS

Information Technology—User Interfaces—Universal Remote Console Part 1: Framework, International Standard, ISO/IEC 24752-1, First Edition, Feb. 15, 2008.
Information Technology—User Interfaces—Universal Remote Console Part 2: User Interface Socket Description, International Standard, ISO/IEC 24752-2, Feb. 15, 2008.
Gottfried Zimmermann et al., "The Universal Control Hub: An Open Platform for Remote User Interfaces in the Digital Home", Human-Computer Interaction, Jul. 22, 2007.
CEA Standard, Web-Based Protocol and Framework for Remote User Interface on UPnP Networks and the Internet (Web4CE), CEA-2014-A, Dec. 2006.

* cited by examiner

*Primary Examiner* — Omar Abdul-Ali
(74) *Attorney, Agent, or Firm* — The Farrell Law Firm, P.C.

(57) ABSTRACT

A method and apparatus for controlling a Remote User Interface (RUI) by a Remote User Interface Client (RUIC) device in a home network, in which it is checked whether control information received from the third RUIC device capable of controlling an RUI realized in the RUIC device was generated by a Control User Interface (CUI) included in an allowed CUI list, and a CUI of the third RUIC device is updated if the received control information was not generated by a CUI included in the allowed CUI list.

24 Claims, 10 Drawing Sheets

METHOD AND APPARATUS FOR CONTROLLING REMOTE USER INTERFACE IN A HOME NETWORK

PRIORITY

This application claims priority under 35 U.S.C. §119(a) to a Korean Patent Application filed in the Korean Intellectual Property Office on Sep. 1, 2009 and assigned Serial No. 10-2009-0082238, the entire disclosure of which is hereby incorporated by reference.

BACKGROUND OF THE INVENTION

1. Field of the Invention

The present invention relates generally to a method and apparatus for controlling a Remote User Interface Client (RUIC) device in a home network, and more particularly, to a User Interface (UI) control method and apparatus for controlling an RUIC device through the third RUIC device.

2. Description of the Related Art

Research to improve home network technologies has been conducted by many industry standards organizations such as Digital Living Network Alliance (DLNA), Home Audio-Video Interoperability (HAVi) and Universal Plug and Play (UPnP).

In a home network, Remote User Interface (RUI) technology may be used to allow one device to control functions of other devices. Briefly, RUI technology, which is based on client-server architecture, allows an RUI client to acquire a UI from an RUI server so that its user may control the RUI server through the UI on the RUI client.

SUMMARY OF THE INVENTION

An aspect of the present invention is to address at least the above-mentioned problems and/or disadvantages and to provide at least the advantages described below. Accordingly, an aspect of the present invention is to provide a method and apparatus for determining whether a control UI of the third RUIC device capable of controlling an RUIC device is a UI appropriate for the RUIC device, or a UI appropriate to control a screen of a remote UI represented or expressed in the RUIC device, in a home network.

Another aspect of the present invention is to provide a method and apparatus for changing a control UI provided from the third RUIC device capable of controlling an RUIC device, to an appropriate control UI, if the provided control UI is inappropriate.

In accordance with one aspect of the present invention, there is provided a method for controlling a Remote User Interface (RUI) by a Remote User Interface Client (RUIC) device in a home network, in which it is checked whether control information received from a third RUIC device capable of controlling an RUI realized in the RUIC device was generated by a Control User Interface (CUI) included in an allowed CUI list, and a CUI of the third RUIC device is updated if the received control information was not generated by a CUI included in the allowed CUI list.

In accordance with another aspect of the present invention, there is provided an apparatus for controlling a Remote User Interface (RUI) in a Remote User Interface Client (RUIC) device, in which an embedded web server receives a control action from a third RUIC device capable of controlling an RUI realized in the RUIC device, and updates a Control User Interface (CUI) upon an instruction, and a Remote Control (RC) plug-in module checks whether control information received from the embedded web server was generated by a CUI included in an allowed CUI list, and instructs the embedded web server to transmit an appropriate CUI to the third RUIC device, if the control information was not generated by a CUI included in the allowed CUI list.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In the following description, a Remote User Interface Server (RUIS) means a device for transmitting a Remote User Interface (RUI) and control information to a client in a client-server architecture system.

Figure 1:
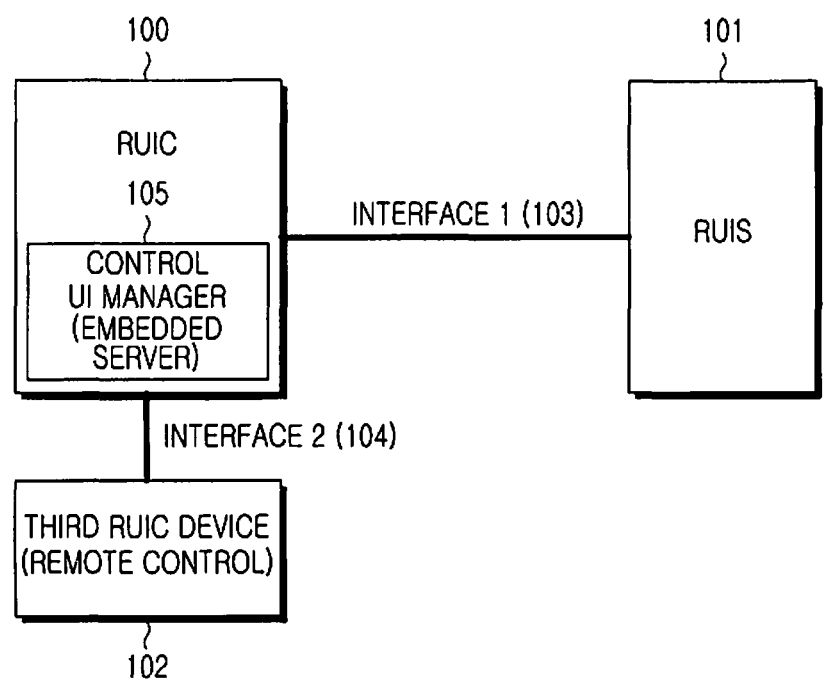
FIG. 1 a block diagram illustrating an architecture for controlling an RUIC device through a third RUIC device in a remote control system, to which the present invention is applicable.

FIG. 1 illustrating an architecture for controlling an RUIC device 100 through the third RUIC device 102 in a remote control system, to which the present invention is applicable.

Figure 2:
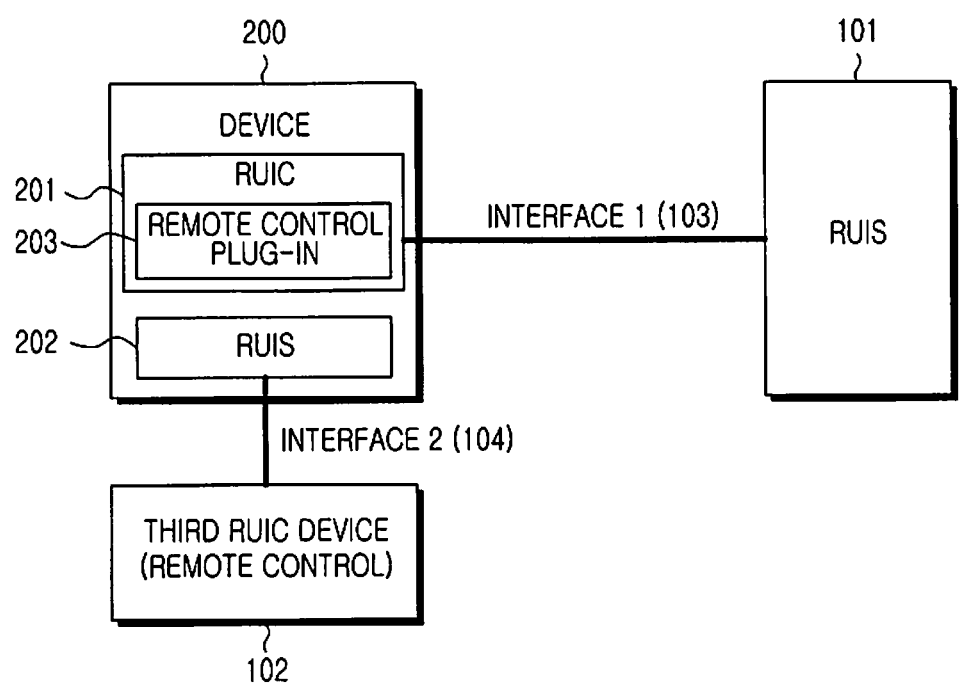
FIG. 2 is a block diagram illustrating an architecture in which the RUIC device in the architecture shown in FIG. 1 is represented as one device and includes a Remote User Interface Server (RUIS) and an RUIC device therein, and the RUIC device has a Remote Control Plug-in module therein.
Figure 3:
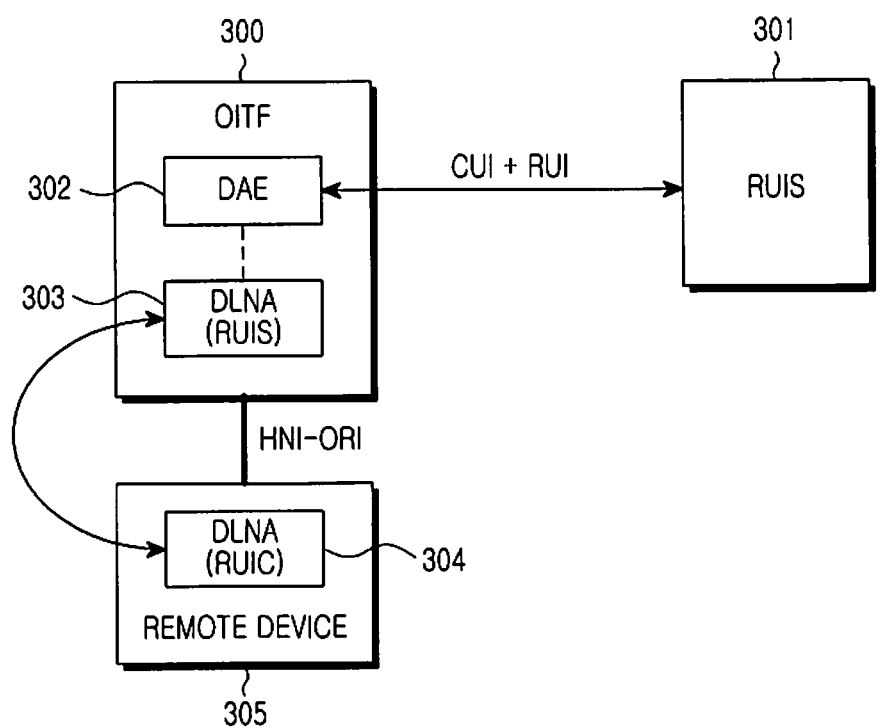
FIG. 3 is a block diagram illustrating an architecture in which the RUIC device in the architecture shown in FIG. 1 is represented as an Open IPTV Terminal Function Entity (OITF) and includes a Declarative Application Environment (DAE) entity and a DLNA RUIS entity serving as an RUIC device, and the third RUIC device is represented as a remote device and includes a DLNA RUIC entity therein.

Referring to FIG. 1, a Remote User Interface Client (RUIC) device 100 receives an RUI and control information from a Remote User Interface Server (RUIS) 101 through an interface #1 103, which is a protocol in use. The control information, as used herein, may even include a UI as well as the control information capable of controlling an RUI represented in the RUIC device 100. The received control information is separated by a control UI manager 105, and a control UI is delivered to the third RUIC device 102 for controlling the RUIC device 100, through the control UI manager 105. The provided control UI is displayed on the third RUIC device 102, and a user may control the RUIC device 100 using the control UI displayed on the third RUIC device 102. The control UI manager 105 may exist inside or outside the RUIC device 100, as a logical entity. FIGS. 2 and 3 show the possible cases where the control UI manager 105 exists outside an RUIC device 201, and the control UI manager 105 may be a DLNA RUIS 303, or an embedded server functional entity for communication with mobile/portable devices existing in an RUIS 202 of Consumer Electronics Association-2014 (CEA-2014) which is a standard of web-based protocol and framework for a remote user interface on UpnP (Universal Plug and Play)™ networks and the Internet (Web4CE) and an Open IPTV Terminal Function Entity (OITF) 300 of Open IPTV Forum, and in addition, may also serve as a remote control plug-in 203 in the RUIC device 201. Through an interface #2 104 between the RUIC device 100 and the third RUIC device 102 in FIG. 1, the RUIC device 100 or an RUI represented in the RUIC device 100 can be controlled by means of a control UI represented in the third RUIC device 102 using Universal Plug & Play (UPnP) or a Hypertext Transfer Protocol (HTTP).

Figure 4:
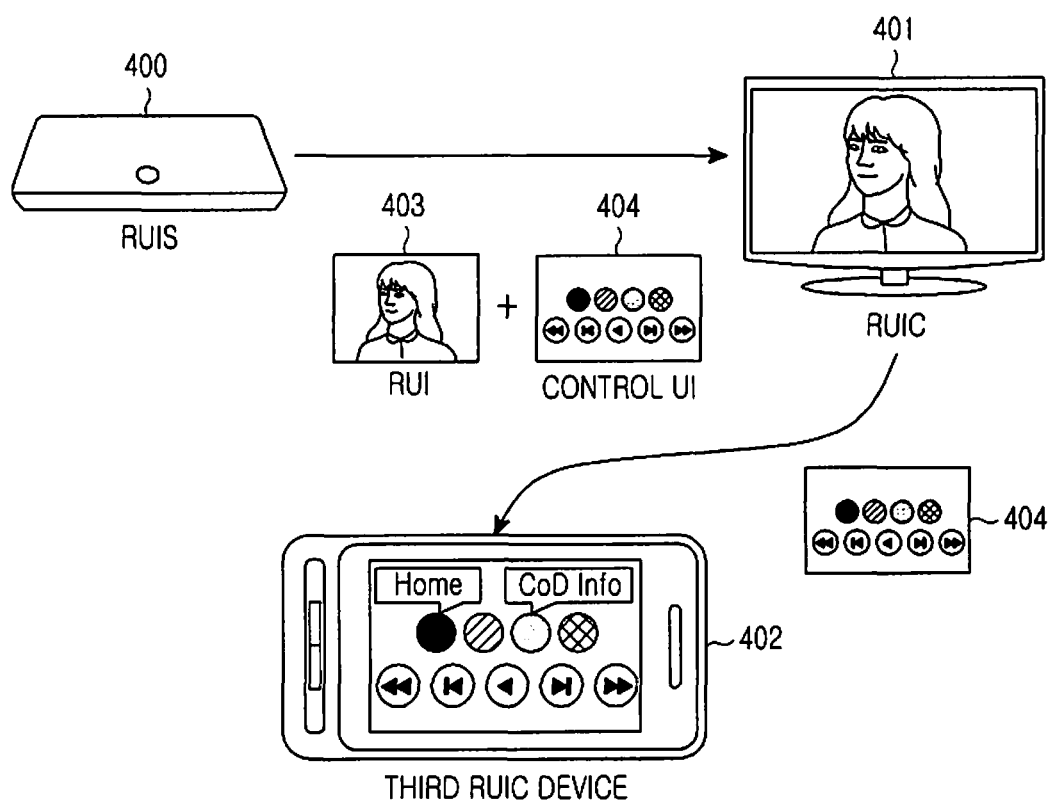
FIG. 4 is a diagram illustrating an example in which a user can control an RUIC device through a control UI of the third RUIC device in a remote control system, to which the present invention is applicable.

FIG. 4 illustrates an example in which a user can control an RUIC device 401 through a control UI of the third RUIC device 402 in a remote control system, to which the present invention is applicable. Upon acquiring an RUI 403 and a control UI 404 from the RUIS 400, the RUIC device 401 represents (expresses) the RUI 403 on its screen and transmits the control UI 404 to the third RUIC device 402. The third RUIC device 402 represents the received control UI 404 on this screen, and the user controls the RUIC device 401 (or the RUI 403 being represented in the RUIC device 401), through the control UI 404 represented on the screen.

In this scenario, generally, the third RUIC device 402 receives from the RUIC device 401 the control UI 404 capable of controlling the RUI 403 corresponding to the content being rendered in the RUIC device 401, and represents the received control UI 404, and then the control UI 404 may be used by the user. However, if control information generated in the control UI 404 represented on the third RUIC device 402 is transmitted to the RUIC device 401, the RUIC device 401 may unconditionally perform an operation corresponding to the control information or transmit the control information to the RUI 403 represented in the RUIC device 401, without determining whether the received control information was generated by an appropriate control UI.

In summary, an RUIC device receives, from an RUTS, a UI represented in the RUIC device and a control UI(s) capable of controlling the UI represented in the RUIC device, and the RUIC device and/or an RUI rendered in the RUIC device are controlled by means of the control UI. The third device, a remote control RUIC device capable of remotely controlling the RUIC device, controls the RUIC device through the UI, and may receive the UI from the RUIC device or the RUIS. The third device may include mobile devices (e.g., mobile phones), portable devices (e.g., small display devices with a communication capability), etc. In the present invention, the remote control RUIC device will be construed to include the third device or the third RUIC device.

An aspect of the present invention provides a method and apparatus for determining whether a control UI for controlling one RUI being rendered in an RUIC device is a UI appropriate to control a UI, and if it is not an appropriate control UI, delivering an appropriate control UI to the third RUIC device, ignoring the control information provided from the third RUIC device.

Figure 5:
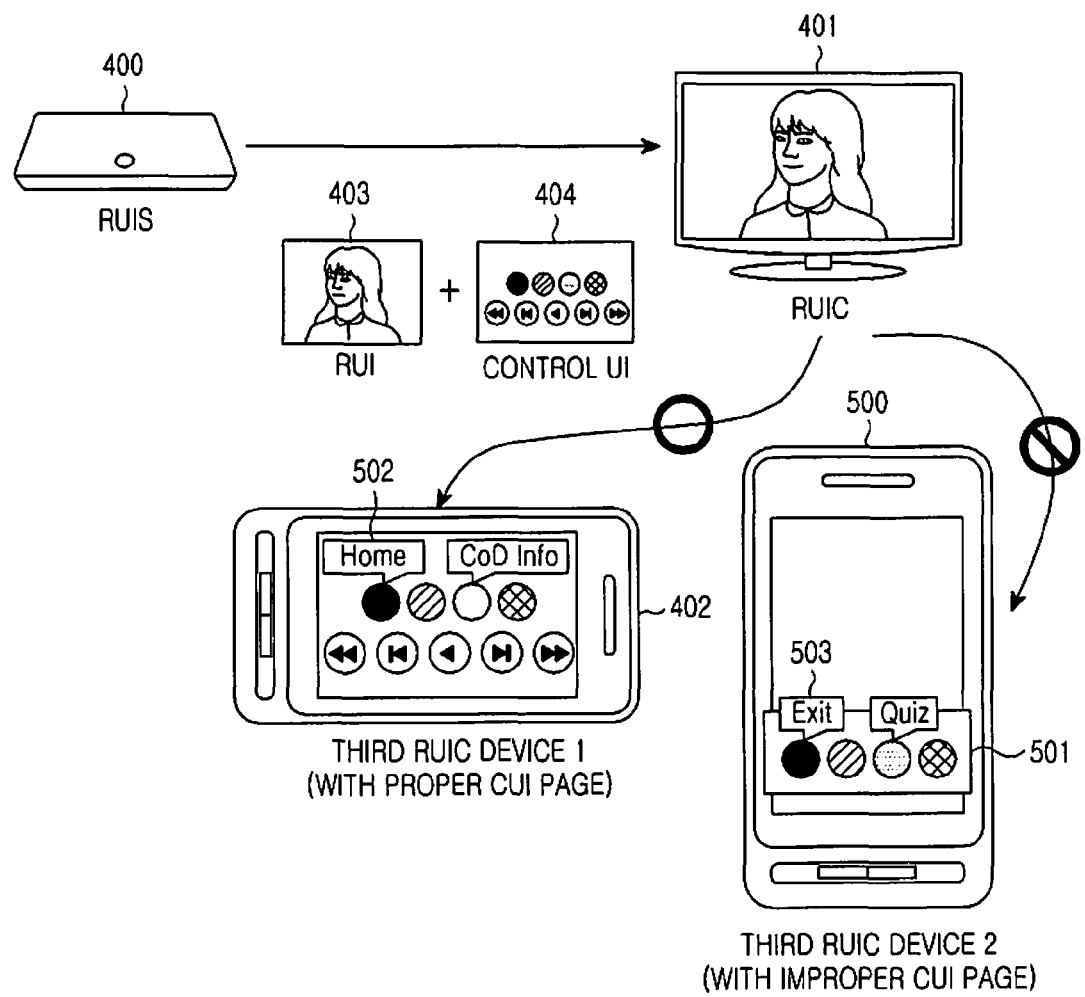
FIG. 5 is a diagram illustrating an example in which a control UI appropriate to and a control UI inappropriate to control an RUI represented in an RUIC device are represented in the third RUIC device in a remote control system, to which the present invention is applicable.

FIG. 5 shows an example in which a control UI 404 appropriate to and a control UI 501 inappropriate to control an RUI 403 represented in an RUIC device 401 are represented in the third RUIC devices 402 and 500, respectively, in a remote control system, to which the present invention is applicable. The third RUIC device #1 402 has the appropriate control UI 404 capable of controlling the RUI 403 presently being represented in the RUIC device 401, and the RUIC device 401 receives control information from the third RUIC device #1 402 and is controlled in an appropriate way according to the received control information. However, if control information is received from the third RUIC device #2 500 having the inappropriate control UI 501, the RUIC device 401 cannot determine at present whether the control information has been received from the appropriate control UI 402. For example, a button 502 in the appropriate control UI 404 is a button to go to a Home menu, but a button 503 (hatched in the same way as the button 502) in the inappropriate control UI 501 sends control information for an Exit action (or command) to exit the screen, to the RUIC device 401. If control information is received from the inappropriate control UI 501 in this way, the RUI 403 in the RUIC device 401 may be changed in contrast with the user's original intention. To avoid these problems, the RUIC device 401 or the RUI 403 should perform the following two operations.

First, if control information is received from the third RUIC devices 402 and 500, the RUIC device 401 determines whether the control information has been generated and received from an appropriate control UI. Second, if the control information has been generated and received from an inappropriate control UI, the RUIC device 401 sends an instruction to change the control UI 501 represented in the third RUIC device 500 that transmitted the inappropriate control UI, to the appropriate control UI 404.

Figure 6:
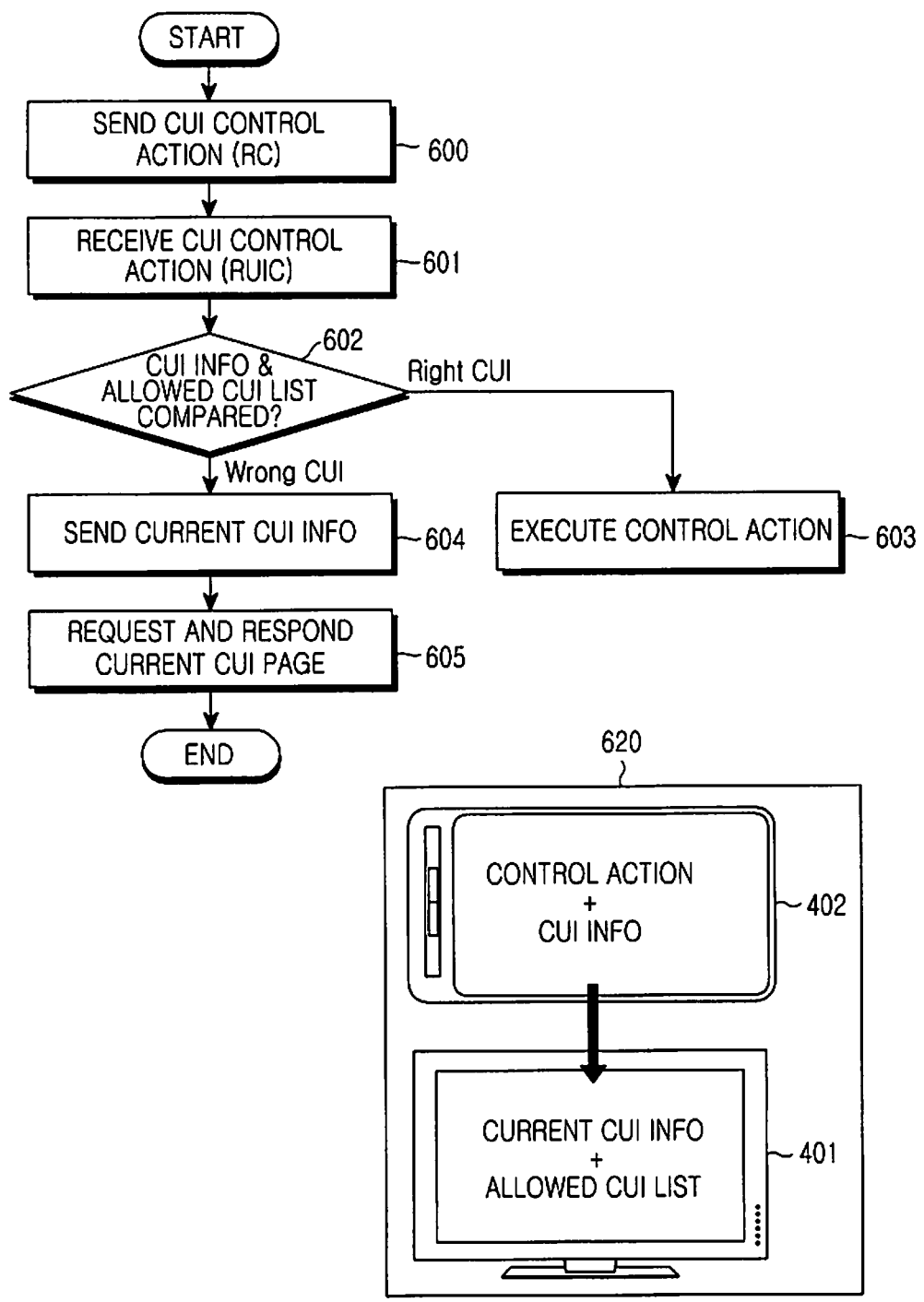
FIG. 6 is a diagram illustrating the order of delivering control information from the third device to an RUIC device, and a flowchart for processing control information between the third device and the RUIC device according to an embodiment of the present invention.

FIG. 6 shows the order of delivering control information from the third device 402 to an RUIC device 401, and a flowchart for processing control information between the third device 402 and the RUIC device 401 according to an embodiment of the present invention.

In step 600, control information is transmitted from the third device 402 to the RUIC device 401. During the transmission, in addition to the existing control information, information about the control UI represented in the third device 402 is transmitted together with the control information. The existing control information may include information related to playing content, such as Play and Stop. The information about a control UI may include, for example, a Uniform Resource Locator (URL) for the control UI, a file name of the control UI, a predefined IDentifier (ID) value for the control UI, etc. The ID value may be defined to have a unique value according to the format of the control UI. The control information used herein may include the information about a control UI and a control action (or control command). In step 601, the RUIC device 401 receives the control information that the third device 402 transmitted in step 600. In step 602, the RUIC device 401 determines whether the control information has been received from an appropriate control UI, using an allowed control UI list (AllowedCUIList) in the RUIC device 401. For example, a determination in step 602 whether the received control information was generated by an appropriate control UI may be made by checking whether a control UI's ID included in the received information about a control UI is present among IDs of control UIs in the allowed control UI list. If the control information has been transmitted from an appropriate control UI, the RUIC device 401 performs an operation for an RUI according to the control operation specified in the control information, in step 603. However, if the control information was transmitted from an inappropriate control UI, the RUIC device 401 transmits a control UI appropriate for the RUI presently being represented in the RUIC device 401 to the third device 402 in step 604, ignoring the received control information.

In step 605, the RUIC device 401 may directly deliver the appropriate control UI to the third device 402, or may transmit an address for the appropriate control UI to the third device 402 so that the third device 402 may invoke the address for the control UI and access the control UI.

If in step 604 the RUIC device 401 informs the third device 402 of an address of the URL where it will download an appropriate CUI page, the third device 402 requests in step 605 a CUI page appropriate to control the RUI being represented in the RUIC device 401 using the address of the URL, and downloads the requested CUI page in response to the request.

Reference numeral 620 shows information used in the third device 402 and the RUIC device 401 according to an embodiment of the present invention. The third device 402 shows that it transmits to the RUIC device 401 a control action, which is information about a control operation, and CUI information presently being driven in the third device 402, and the RUIC device 401 shows that it presently stores the current CUI information, which is information about the CUI of the RUIC device 401, and information about an allowed control UI list.

Figure 7:
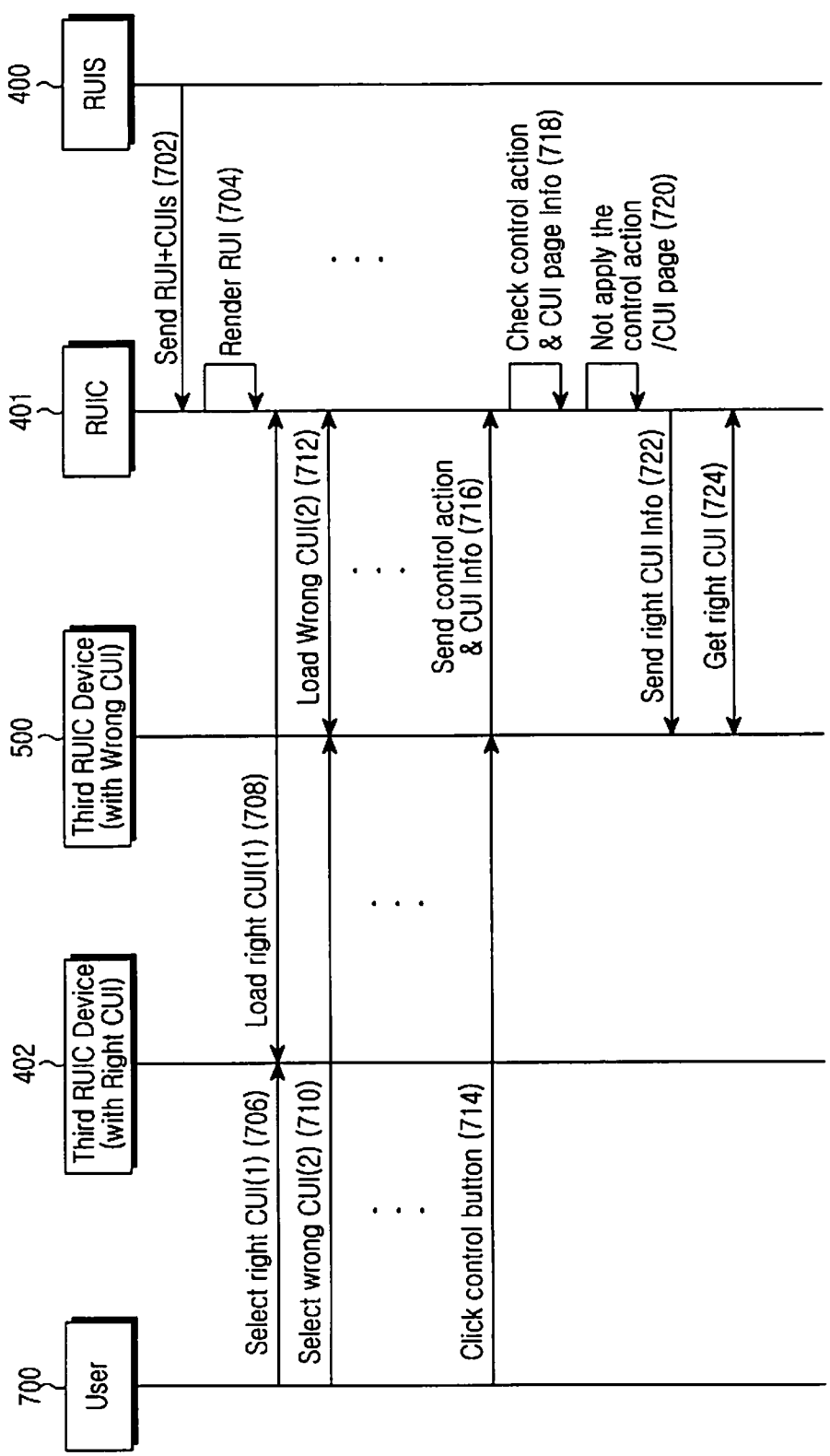
FIG. 7 is a signaling diagram showing the order of delivering control information from the third device to an RUIC device and a method of processing the control information according to an embodiment of the present invention.

FIG. 7 shows the order of delivering control information from the third device 402 to an RUIC device 401 and a method of processing the control information according to an embodiment of the present invention. In step 702, an RUIS 400 sends an RUI and control UIs capable of controlling the RUI, to the RUIC device 401. In step 704, the RUIC device 401 renders the RUI and represents it on its screen. A user 700 can control the RUIC device 401 or the RUI represented in the RUIC device 401 through the third RUIC devices 402 and 500. Steps 706 and 708 represent the case where as the user 700 requests an address of an appropriate control UI (or right control UI (1)), the third RUIC device 402 receives the appropriate control UI. Steps 710 and 712 shows the case where the user 700 requests an address of an inappropriate control UI (or wrong control UI (2)), or even though the user 700 has requested an address of an appropriate control UI, the third RUIC device 500 has received the address of an inappropriate control UI. For example, in steps 710 and 712, the user 700 might have pushed a Back button through the third device, or might have directly invoked an address of an inappropriate control UI using the URL history records. Otherwise, as the RUI represented in the RUIC device 401 was changed by another user, even though the control UI the user 700 presently holds has not been changed, the user 700 might have controlled the RUIC device 401 using an inappropriate control UI regardless of his or her intention or contrary to the RUI presently being represented in the RUIC device 401.

In addition, there are various other cases where the control UI the user presently uses is mismatched with the RUI represented in the RUIC device 401. In these cases, the RUIC device 401 changes the control UI of the third RUIC device 500 to an appropriate control UI, recognizing that the control information transmitted from the third RUIC device 500 was from an inappropriate control UI. In steps 714 and 716, if the user 700 controls the RUIC device 401 through an inappropriate control UI rather than the control UI created to control the RUI presently being represented in the RUIC device 401, the third RUIC device 500 transmits wrong control information to the RUIC device 401 in step 716.

In step 718, the RUIC device 401, which has received the wrong control information, first determines whether the received control information is appropriate. To do so, the RUIC device 401 extracts information about the relevant control UI from the control information received from the inappropriate control UI in the third RUIC device 500, and compares it with its allowed control UI list. If information indicating that the RUI represented in the RUIC device 401 does not need to be controlled by a specific control UI is present in the RUIC device 401 or the RUI represented in the RUIC device 401, the RUIC device 401 performs an operation according to the received control information. In step 718, the RUIC device 401 may also check whether the control actions received from the third RUIC device 500 are appropriate. For example, if the RUIC device 401 can store functions corresponding to control actions in the form of a table and a function corresponding to the control action received in step 716 is stored in the table, the RUIC device 401 may determine that the received control action is an appropriate control action.

If it is determined in step 718 that the control information has been received from the third RUIC device 500 running an inappropriate control UI, the RUIC device 401 does not apply the control action (or the received control information) or its associated control UI page, in step 720. In step 722, the RUIC device 401 delivers information about an appropriate control UI to the third RUIC device 500, which has an inappropriate control UI. In step 724, if the control UI information is an address for a control UI, the third RUIC device 500 invokes the address and receives an appropriate control UI from the RUIC device 401.

Figure 8:
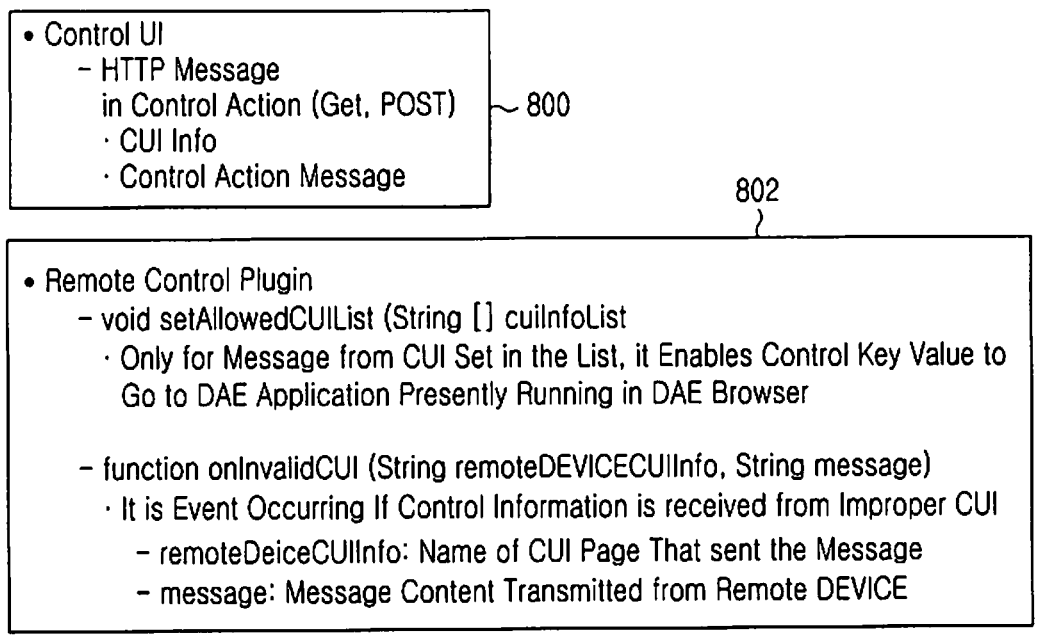
FIG. 8 is a diagram illustrating a definition of a plug-in and an object capable of being applied to the Open IPTV Forum DAE specification according to an embodiment of the present invention.

FIG. 8 shows a definition of a plug-in and an object capable of being applied to the Open IPTV Forum DAE specification according to an embodiment of the present invention. First, when sending an HTTP Message to an RUIC device, a control UI 800 represented in the third device simultaneously transmits information about the control UI (CUI Info) and the basic control information to the RUIC device. The CUI Info may include a name of the control UI, an address of the control UI, a unique ID of the control UI, etc. and the basic control information may include PLAY, STOP, PAUSE, VOLUME_UP/DOWN, etc. The control UI 800 may be transmitted through an HTTP message as described below in step 918 of FIG. 9. Reference numeral 802 shows an example of functions that can be realized in a remote control plugin module according to an embodiment of the present invention.

After receiving control information from the control UI 800, if CUI Info is present in the received control information, an embedded server in the RUIC device transmits the CUI Info and the basic control information received from the third RUIC device, to a remote control plug-in module of a Declarative Application Environment (DAE) module. The remote control plugin module offers a void setAllowedCUIList (String [ ] cuiInfoList), which is a function by which a DAE application module can set an allowed control UI list, and the remote control plug-in module compares the control information transmitted from the third RUIC device with the allowed control UI list set by the DAE application module. As a result of the comparison, if the control information transmitted from the third RUIC device is inappropriate, the remote control plug-in module transmits an on InvalidCUI event to the DAE application module. An event parameter carries CUI Info on a 'remoteDeviceCUIInfo' parameter and basic control information on a 'message' parameter, which are provided from the third RUIC device.

Figure 9:
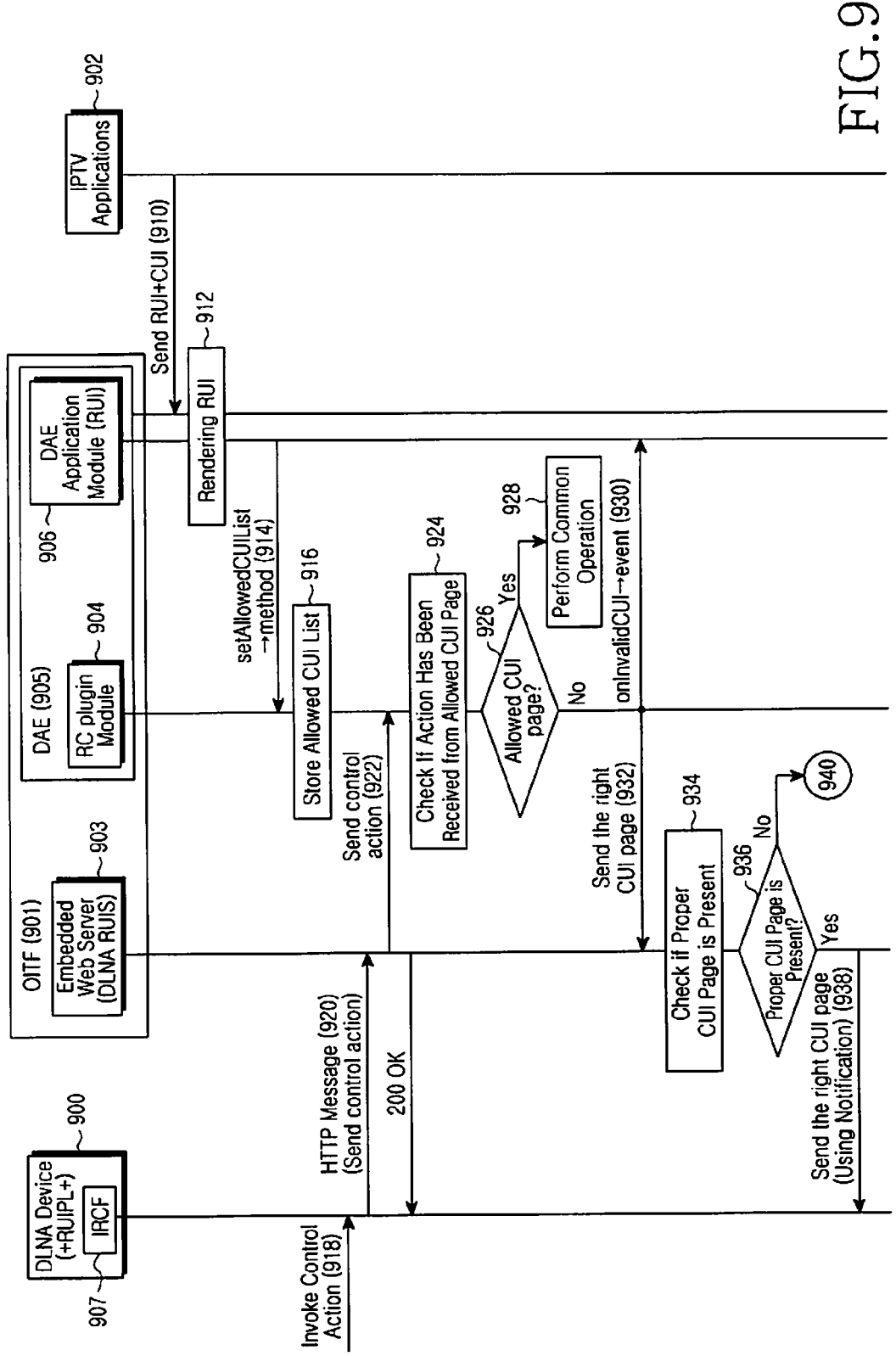
FIG. 9 is a signaling diagram capable of being applied to the Open IPTV Forum DAE specification according to an embodiment of the present invention.
Figure 10:
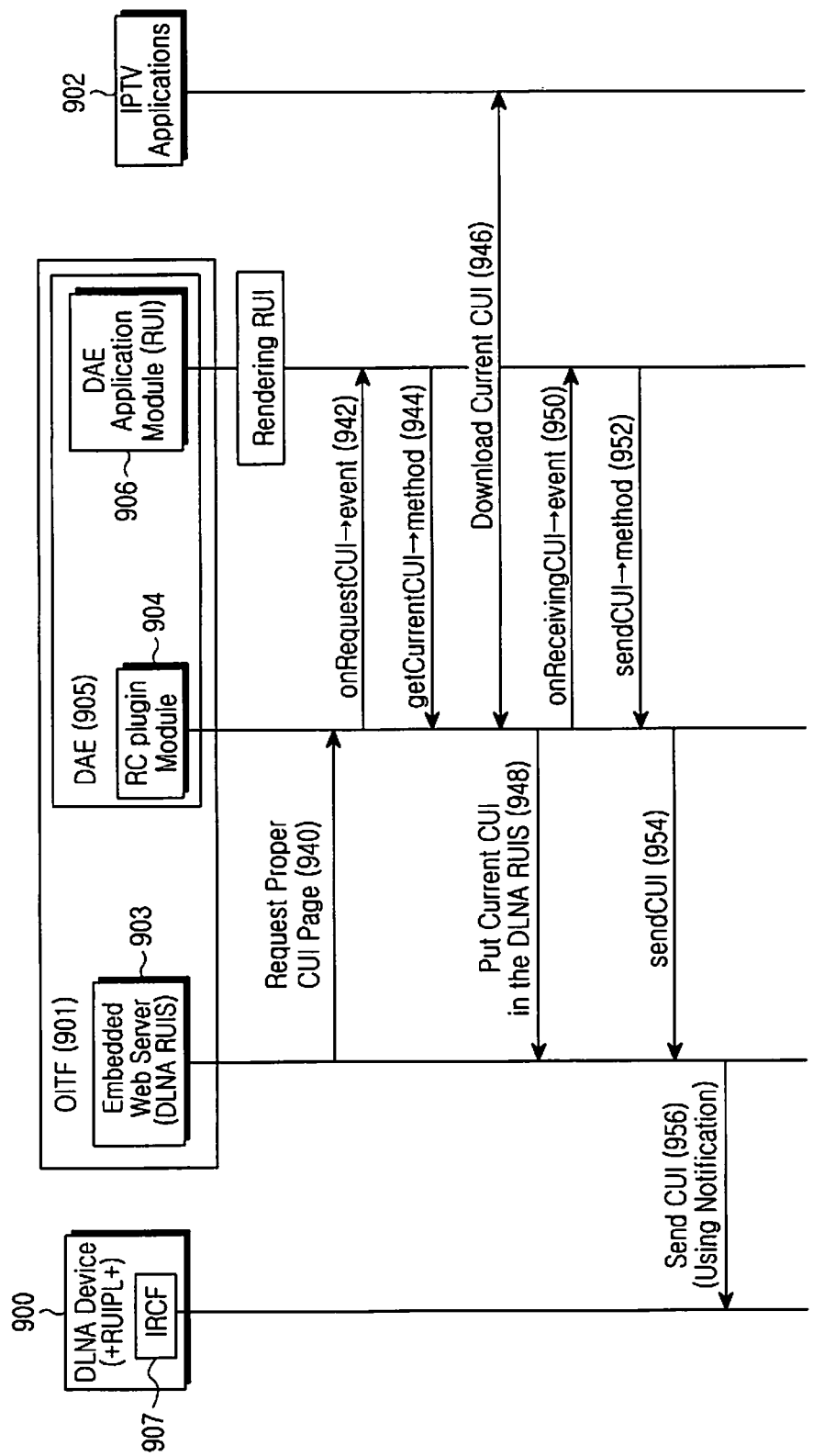
FIG. 10 is a signaling diagram for an example where it is determined in FIG. 9 that an appropriate CUI page is not present in a DLNA RUIS (an embedded web server), according to an embodiment of the present invention.

FIGS. 9 and 10 are signaling diagrams capable of being applied to the Open IPTV Forum DAE specification according to an embodiment of the present invention.

In FIGS. 9 and 10, a DLNA device 900 corresponds to the third RUIC device, an OITF terminal 901 corresponds to an RUIC device, and an IPTV application 902 corresponds to an RUIS. In addition, an embedded web server 903 is embedded in the OITF terminal 901 along with DLNA functions, and serves as a server for the DLNA device 900, or the third RUIC device. The embedded web server 903 corresponds to the RUIS 202 or the DLNA RUIS 303. Reference numeral 907 indicates a web browser running in the DLNA device 900.

In reality, the DLNA device 900 may be a common remote controller, the OITF terminal 901 may be a set-top box, the IPTV application 902 may be an IPTV service provider, and a DAE 905 may be a web browser realized in the set-top box.

This is a mere example of the case where the present invention is applied to the Open IPTV Forum DAE standard. However, if the present invention is applied to other standards, the blocks shown in FIGS. 9 and 10 are replaceable with other blocks serving as corresponding operations.

In step 910, the IPTV application 902 transmits an RUI, which is a DAE application, and a control UI (CUI) to the DAE 905 in the OITF terminal 901. In step 912, a DAE application module 906 in the DAE 905 represents the RUI, or the DAE application, on its screen, and when the RUI is running, the DAE application module 906 creates an allowed control UI list using a setAllowedCUIList function of a Remote Control (RC) plug-in module 904 in the DAE 905, and sends it to the RC plug-in module 904 in step 914. In step 916, the RC plug-in module 904 stores the created allowed control UI list. Thereafter, if a user generates control information for a control action through the DLNA device 900 in step 918, the generated control information is transmitted to the embedded web server 903 in the OITF terminal 901 through an HTTP message in step 920. In other words, in steps 918 and 920, the control information generated by a CUI running in the DLNA device 900 is transmitted to the OITF terminal 901.

In step 922, the embedded web server 903, or the DLNA RUIS, transmits the control information to the RC plug-in module 904. In step 924, the RC plug-in module 904 checks if the received control information was from an allowed control UI page. A method for checking in step 924 whether the control information was transmitted from the allowed control UI page is the same as described above.

In other words, the RC plug-in module 904 may determine if the control information was received from the allowed control UI page, by checking whether a control UI's ID included in control UI information (CUI Info) received from the DLNA device 900, or the third RUIC device, is included in the previously stored allowed control UI list.

If it is determined in step 926 that the control information was received from the allowed control UI page, the RC plug-in module 904 performs a common operation in step 928. For example, the RC plug-in module sends control information received to the DAE application module 906 so that the RUI is controlled as the user desires in step 928. However, if it is determined in step 926 that the control information was not received from the allowed control UI page, the RC plug-in module 904 generates in step 930 an on InvalidCUI event for informing the DAE application module 906 that the control information was received from an invalid control UI. In step 932, the RC plug-in module 904 requests the embedded web server 903 to transmit an appropriate control UI page to the DLNA device 900.

In step 934, the embedded web server 903 checks for the presence/absence of an appropriate CUI page. The appropriate CUI page is a CUI page capable of accurately controlling an RUI being run in the OITF terminal 901 through the DLNA device 900, or the third RUIC device. If it is determined in step 936 that an appropriate control UI is not present, the embedded web server 903 performs a sequence shown in step 940 of FIG. 10. However, if it is determined in step 936 that an appropriate CUI page is present, the embedded web server 903 sends the appropriate CUI page to the DLNA device 900 in step 938.

If it is determined in step 936 that the appropriate CUI page is not present, the embedded web server 903 requests the RC plug-in module 904 to provide an appropriate control UI in step 940. In response, the RC plug-in module 904 generates an event for requesting the DAE application module 906 to provide an appropriate control UI, in step 942. In response, the DAE application module 906 assigns a URL or a name for a control UI appropriate for the current RUI, to the RC plug-in module 904 in step 944, thereby commending the RC plug-in module 904 to download the control UI appropriate for the currently running RUI. Then, the RC plug-in module 904 downloads the control UI from the IPTV application 902, or the RUIS, in step 946 and delivers the downloaded control UI to the embedded web server 903 in step 948.

After completing the downloading, the RC plug-in module 904 generates an on ReceivingCUI event informing the DAE application module 906 of the completion of the downloading, in step 950. Then in step 952, the DAE application module 906 sends the RC plug-in module 904 a command to request the RC plug-in module 904 to transmit the downloaded control UI. Upon receiving the command in step 952, the RC plugin module 904 sends the embedded web server 903 a command to transmit the control UI to the DLNA device 900, in step 954. Then in step 956, the embedded web server 903 transmits the control UI to the DLNA device 900 using a notification.

As is apparent from the foregoing description, according to embodiments of the present invention, an RUIC device determines if a control UI received from the third RUIC device capable of remotely controlling the RUIC is appropriate or valid, and if not so, requests to transmit an appropriate control UI, thereby preventing malfunction caused by a wrong control UI between the third RUIC device and the RUIC device.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling a user interface by a first device in a home network, the method comprising:
   receiving, from an application server, an application and Control User Interfaces (CUIs) for controlling the application;
   displaying the application and transmitting the received CUIs to a second device;
   determining, if control information is received from the second device, whether first CUI information included in the control information corresponds to second CUI information for the displayed application; and
   transmitting, to the second device, the second CUI information if the first CUI information does not correspond to the second CUI information.

2. The method of claim 1, wherein the first CUI information includes an Identifier (ID) of a CUI used by the second device.

3. The method of claim 1, further comprising performing, if the first CU1 information corresponds to the second CUI information, an operation according to the control information.

4. The method of claim 2, wherein the first CUI information further includes at least one of a Uniform Resource Locator (URL) for a corresponding CUI, and a file name of the corresponding CUI.

5. The method of claim 1, further comprising:
   transmitting, to the second device, a Uniform Resource Locator (URL) for acquiring CUIs according to the second CUI information.

6. The method of claim 1, wherein the second CUI information includes an Identifier (ID) for each of the CUIs.

7. The method of claim 1, further comprising:
   transmitting, to the second device, CUIs according to the second CUI information.

8. A first device for controlling a user interface in a home network, the first device comprising:
   a receiver for receiving, from an application server, an application and Control User Interfaces (CUIs) for controlling the application;
   a display unit for displaying the application;
   a transmitter for transmitting the CUIs to a second device; and
   a controller for determining, if control information is received from the second device, whether first CUI information included in the control information corresponds to second CUI information for the displayed application, and controlling, if the first CUI information does not correspond to the second CUI information, the transmitter to transmit, to the second device, the second CUI information.

9. The first device of claim 8, wherein the first CUI information includes an Identifier (ID) of a CUI used by the second device.

10. The first device of claim 8, wherein if the first CUI information corresponds to the second CUI information, the controller performs an operation according to the control information.

11. The first device of claim 9, wherein the first CUI information further includes at least one of a Uniform Resource Locator (URL) for a corresponding CUI, and a file name of the corresponding CUI.

12. The first device of claim 8, wherein the transmitter transmits, to the second device, a Uniform Resource Locator (URL) for acquiring CUIs according to the second CUI information.

13. The first device of claim 8, wherein the second CUI information includes an Identifier (ID) for each of the CUIs.

14. The first device of claim 8, wherein the transmitter transmits, to the second device, CUIs according to the second CUI information.

15. A method for controlling a user interface by a second device in a home network, the method comprising:
   receiving, from a first device, Control User Interfaces (CUIs) for controlling an application;
   transmitting, to the first device, control information including first CUI information according to a selection of a user of the second device;
   determining whether second CUI information for an application displayed in the first device is received from the first device; and
   updating the CUIs according to the second CUI information, if the second CUI information is received from the first device.

16. The method of claim 15, wherein the first CUI information includes an Identifier (ID) of a CUI according to a selection of the user.

17. The method of claim 16, wherein the CUI information further includes at least one of a Uniform Resource Locator (URL) for the CUI, and a file name of the CUI.

18. The method of claim 15, further comprising:
   receiving, from the first device, a Uniform Resource Locator (URL) for acquiring CUIs according to the second CUI information.

19. The method of claim 15, further comprising:
   receiving, from the first device, CUIs according to the second CUI information.

20. A second device for controlling a user interface in a home network, the method comprising:
   a receiver for receiving, from a first device, Control User Interfaces (CUIs) for controlling an application;
   a transmitter for transmitting, to the first device, control information including first CUI information according to a selection of a user of the second device; and
   a controller for determining whether second CUI information for an application displayed in the first device is received from the first device, and updating the CUIs according to the second CUI information, if the second CUI information is received from the first device.

21. The second device of claim 20, wherein the first CUI information includes an Identifier (ID) of a CUI according to a selection of the user.

22. The second device of claim 21, wherein the CUI information further includes at least one of a Uniform Resource Locator (URL) for the CUI, and a file name of the CUI.

23. The second device of claim 20, wherein the receiver receives, from the first device, a Uniform Resource Locator (URL) for acquiring CUIs according to the second CUI information.

24. The second device of claim 20, wherein the receiver receives, from the first device, CUIs according to the second CUI information.

* * * * *